United States Patent
Sesha et al.

(10) Patent No.: US 12,027,044 B2
(45) Date of Patent: Jul. 2, 2024

(54) ASSIGNING OUTLIER-RELATED CLASSIFICATIONS TO TRAFFIC FLOWS ACROSS MULTIPLE TIME WINDOWS

(71) Applicant: HEWLETT PACKARD ENTERPRISE DEVELOPMENT LP, Houston, TX (US)

(72) Inventors: Madhusoodhana Chari Sesha, Bangalore (IN); Sunil Sukumaran, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 320 days.

(21) Appl. No.: 17/515,309

(22) Filed: Oct. 29, 2021

(65) Prior Publication Data
US 2023/0135485 A1  May 4, 2023

(51) Int. Cl.
*G08G 1/01* (2006.01)

(52) U.S. Cl.
CPC ......... *G08G 1/0145* (2013.01); *G08G 1/0133* (2013.01); *G08G 1/0141* (2013.01)

(58) Field of Classification Search
CPC ... G08G 1/0145; G08G 1/0133; G08G 1/0141
See application file for complete search history.

(56) References Cited

U.S. PATENT DOCUMENTS 8,737,204 B2 * 5/2014 Szabo .................. H04L 43/026
370/229
2014/0310396 A1 * 10/2014 Christodorescu ...... G06N 20/20
709/224
2015/0229661 A1 * 8/2015 Balabine ............. H04L 63/1425
726/22

(Continued)

OTHER PUBLICATIONS

Black, T., "ArubaOS-CX: A Modern, Programmable Network for the Mobile and IoT Age," Aug. 14, 2017, Blog, HPE Aruba Networking, https://community.arubanetworks.com/browse/articles/blogviewer?blogkey=aa3b1fde-46b9-4c4d-900c-bbaadeeacaf6, 6 pages.

(Continued)

*Primary Examiner* — Ramsey Refai
(74) *Attorney, Agent, or Firm* — Sheppard Mullin Richter & Hampton LLP

(57) ABSTRACT

Systems and methods are provided for combining a multiple sub-time window sampling architecture with machine learning to detect outlier traffic flow behavior which may indicate malicious/problematic network activity. For example, a network device may obtain a sample of traffic flow data during a defined time window. The sample of traffic flow data may comprise information associated with a sampled subset of traffic flows transferred by a network device in the defined time window. The network device may partition the defined time window into two or more sub-time windows. In each sub-time window, using machine learning, the network device may assign an outlier-related classification to each sampled traffic flow based on the relative behavioral characteristics of all the sampled traffic flows. The network device may aggregate the outlier-related classifications for each sampled traffic flow across multiple sub-time windows, and process traffic flows based on the aggregated outlier-related classifications.

20 Claims, 5 Drawing Sheets

(56) References Cited

U.S. PATENT DOCUMENTS

2016/0218949 A1* 7/2016 Dasgupta ............ G06F 11/3409
2017/0099310 A1* 4/2017 Di Pietro ............ H04L 63/1425

OTHER PUBLICATIONS

Juniper Networks, "NetScreen Products Archives," Sep. 7, 2023, Documentation Archives (Portable Libraries) pp. 28-29, https://www.juniper.net/documentation/US/en/internal/archives/topics/concept/netscreen-archives.html,.
Junpier Networks, "JSA Series Archives," Nov. 6, 2023, Documentation Archives (Portable Libraries) pp. 13-16, https://www.juniper.net/documentation/US/en/internal/archives/topics/topic-map/strm-jsa-archives.html.
Mubaris, "K-Means Clustering in Python," Oct. 1, 2017, https://mubaris.com/posts/kmeans-clustering/, 13 pages.
Pandas, "About Pandas," Python Data Analysis Library, 2024, https://pandas.pydata.org/about/index.html., 3 pages.
Scikit-Learn.org, "Scikit-Learn," 2024, Machine Learning in Python, https://scikit-learn.org/stable/, 3 pages.
sflow.org, "Traffic Monitoring Using sFlow," 2003, https://sflow.org/sFlowOverview.pdf, 5 Pages.

\* cited by examiner

ASSIGNING OUTLIER-RELATED CLASSIFICATIONS TO TRAFFIC FLOWS ACROSS MULTIPLE TIME WINDOWS

BACKGROUND

Data may be transferred from one computer network to another computer network in the form of data packets (in some cases, this transfer may occur via the Internet). Similarly, a computer network may exchange data packets with the Internet.

A "traffic flow" can refer to a sequence of one or more data packets sent from a particular source to a particular destination. For example, a traffic flow may be a sequence of messages sent from a source computer to a destination computer during a chat session. Similarly, there may be a traffic flow associated with a web browser session between the Internet and a destination computer.

Networking devices (e.g. switches, routers, firewalls, or any other hardware or software implemented systems capable of controlling traffic flows, etc.) can transfer traffic flows between computer networks (they can also transfer traffic flows between components/devices within a computer network). For example, a network device may transfer traffic flows between the Internet and the various client devices of an office computer network. Similarly, a network device may transfer a traffic flow from a computer on one network (e.g. a law firm computer network) to a computer on another network (e.g. a bank computer network). With the complex computing networks of today, millions of traffic flows may be transferred by a single network device daily.

Machine learning may refer to the use of artificial intelligence (e.g. machine learning algorithms) to imitate the way that humans learn. Machine learning algorithms may build models based on sample data, known as "training data", in order to make predictions or decisions.

Unsupervised machine learning is one approach to machine learning. In unsupervised machine learning (as opposed to supervised machine learning), no sample inputs are provided to machine learning algorithms. Instead, the machine learning algorithms are left to find structure in their own inputs.

BRIEF DESCRIPTION OF THE DRAWINGS

The present disclosure, based on one or more various examples, is described in detail with reference to the following figures. The figures are provided for purposes of illustration only and merely depict typical or example examples.

Figure 1:
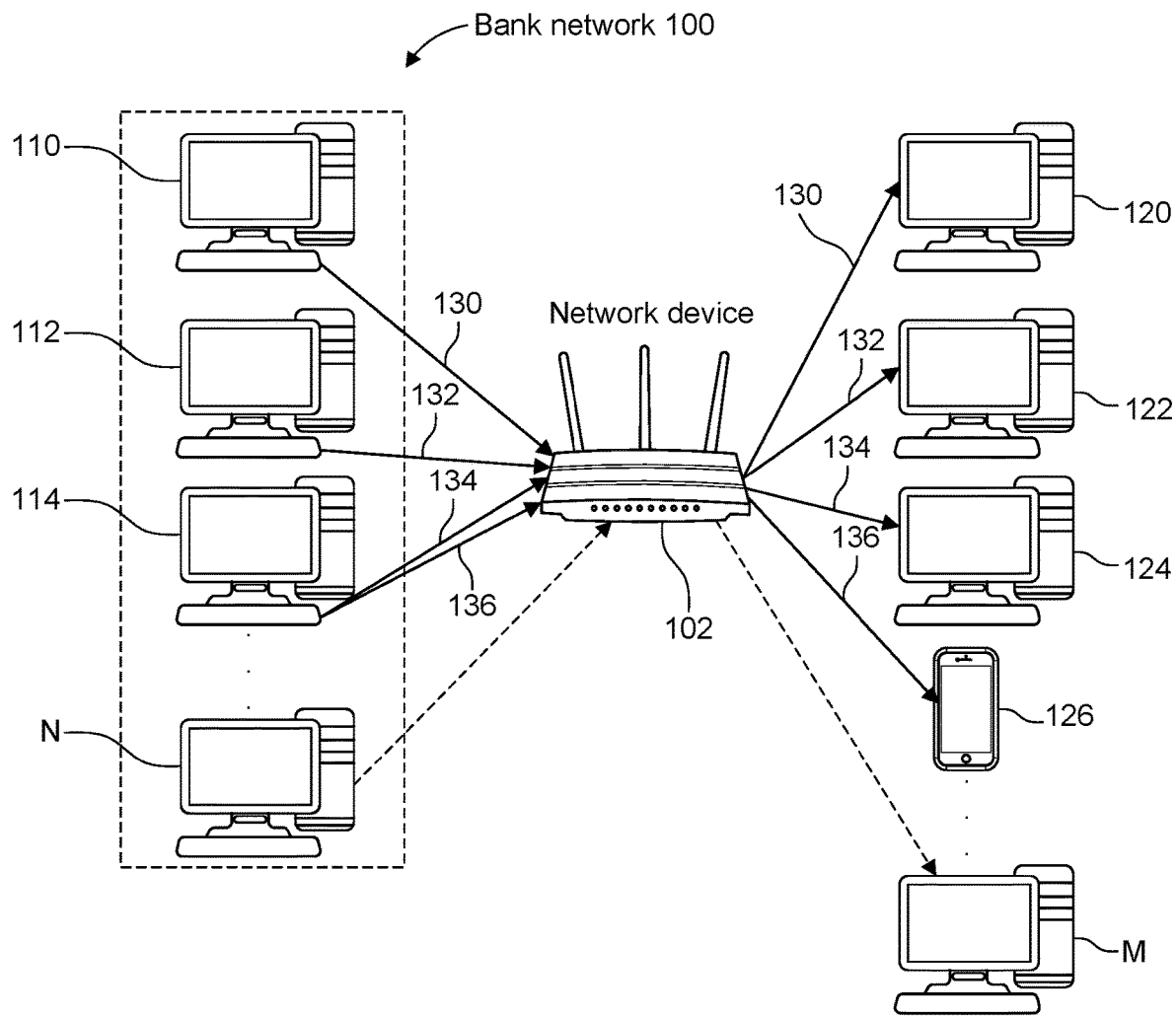
FIG. 1 is a diagram illustrating an example scenario where a network device transfers traffic flows between computers/devices on different networks.

The figures are not exhaustive and do not limit the present disclosure to the precise form disclosed.

DETAILED DESCRIPTION

As described above, network devices can transfer traffic flows between computer networks. For example, network devices may be used to connect computing networks of various enterprises (e.g. banks, hospitals, government offices, data centers) to the Internet and/or each other. With the complex computing networks of today, millions of traffic flows may be transferred by a single network device daily.

Traffic flow analytics (as used herein traffic flow analytics may refer to analysis of traffic flow data/behavior) may be used to discern malicious/problematic activity (e.g. hacking, bank fraud, malfunctioning equipment, network configuration failures, and other activities) from this immense amount of traffic flow data. Traditionally, traffic flow analytics has been viewed as an "export-type" process. In particular, traffic flow data will be sampled at the network device level (e.g. by the network device which transfers the sampled traffic flows), and exported to an external analytics service (e.g. a cloud-based analytics service). Using this approach, sampled traffic flow data is typically exported in-bulk (e.g. after one or more hours, after one or more days, etc.) in order to conserve network resources (e.g. network bandwidth, data storage, etc.). Accordingly, an external analytics service typically examines sampled traffic flow data/behavior over long time intervals (e.g. one or more hours, one or more days, etc.). However, what those skilled in the art may not appreciate is that by performing traffic flow analytics over long time intervals, these external analytics services may lack refinement in techniques such as outlier detection. Moreover, because sampled traffic flow data is exported to external analytics services in-bulk, analytical insights may lag behind real-time traffic flow behavior at the network device level. Said differently, because traffic flow analytics is removed from the actual data source (e.g. the network device), by the time a malicious/problematic traffic flow is identified, it may be too late to take precautionary/remedial action.

Against this backdrop, examples of the presently disclosed technology provide improved/optimized, real-time traffic flow analytics by combining a multiple sub-time window sampling architecture with outlier detection implemented at the network device level. As will be described below, this multiple sub-time window sampling architecture improves/optimizes outlier detection by reducing average value convergence (as used herein, average value convergence may refer to the tendency of average behavioral characteristic values for sampled traffic flows to converge to common/similar values over time) and the occurrence of false positives (as used herein a false positive may refer to an instance where a sampled traffic flow is classified as an outlier when the activity it is associated with is not malicious/problematic).

Performing outlier detection at the network device level removes the intermediate export step required by other technologies. Accordingly, sampled traffic flow data may be analyzed within numerous sub-time windows, without straining network resources with numerous/frequent data exports. Moreover, because sampled traffic flow data is analyzed in relatively short sub-time windows (e.g. 10 minutes, 1 minute, 30 seconds, 1 second, etc.), analytical insights may respond to real-time traffic flow behavior more quickly than would be possible using a traditional "export-type" approach. Said differently, because traffic flow analytics is being performed (a) more quickly, and (b) closer to the data source—examples of the presently disclosed technology may identify problematic/malicious traffic flow behavior more quickly than other technologies.

Examples of the presently disclosed technology improve/optimize outlier detection by assigning outlier-related classifications (as used herein, an outlier-related classification may refer to a classification assigned to a sampled traffic flow which either (a) classifies a sampled traffic flow as an outlier or not an outlier; or (b) quantifies how much of an outlier a sampled traffic flow is compared to other sampled traffic flows) to sampled traffic flows across multiple sub-time windows. In various examples, these sub-time windows may be relatively short (e.g. 10 minutes, 1 minute, 30 seconds, 1 second, etc.) By assigning outlier-related classifications in short sub-time windows, examples may reduce average value convergence. By reducing average value convergence, examples may improve outlier detection by identifying/classifying more traffic flows as outliers.

As more traffic flows are identified/classified as outliers in shorter sub-time windows, examples may reduce the occurrence of false positives by aggregating outlier-related classifications across multiple sub-time windows. Here, the basic idea is that the traffic flows which are associated with malicious/problematic activity (e.g. hacking, malfunctioning equipment, etc.) are likely to exhibit outlier-type behavior across a greater number of sub-time windows than traffic flows which are associated with benign activity (as used herein benign activity may refer to activity which is not malicious/problematic).

Accordingly, in examples of the presently disclosed technology, a network device may obtain a sample of traffic flow data during a defined time window. The sample of traffic flow data may comprise information associated with a sampled subset of traffic flows transferred by the network device in the defined time window. Each sampled traffic flow may have/exhibit certain behavioral characteristics (e.g. total number of packets, mean packet length, rate of packet transmission, etc.).

The network device may partition the defined time window into two or more sub-time windows. As described above, the length of these sub-time windows may be relatively short (e.g. 10 minutes, 5 minutes, 1 minute, 30 seconds, 2 seconds, etc.).

In each sub-time window, using machine learning, the network device may assign an outlier-related classification to one or more of the sampled traffic flows based on the relative behavioral characteristics of the sampled traffic flows. This may comprise comparing one or more behavioral characteristics of a traffic flow to corresponding behavioral characteristics of other sampled traffic flows. For example, the network device may discern that a certain traffic flow (i.e. "the suspect traffic flow") has a much longer average packet length than any of the other traffic flows (as will be described below, this may be indicative of anomalous activity on the network). The network device may assign the suspect traffic flow an outlier-related classification based on this finding. For example, using a simple binary classification approach (i.e. outlier or not outlier), the network device may classify the suspect traffic flow as an outlier for that sub-time window. In another example, using a "sliding scale" approach, the network device may quantify how much of an outlier a traffic flow was during a sub-time window (e.g. by assigning it an outlier-related classification on a numerical scale).

Either during, or upon completion of the defined time window, the network device may aggregate the outlier-related classifications for one or more of the sampled traffic flows. For example, using the simple binary classification approach described above, the network device may count the number times that a sampled traffic flow was classified as an outlier. As will be described below, by aggregating outlier-related classifications across multiple sub-time windows, the network device may improve outlier detection accuracy Based on the aggregated outlier-related classifications for one or more sampled traffic flows, the network device may define a subset of the sampled traffic flows as "top outliers" for the defined time window (as used herein, the top outlier subset may comprise the subset of sampled traffic flows which have higher aggregated outlier-related classifications than sampled traffic flows which are not included in the top outlier subset). The network device may consider any number of factors when defining this subset. For example, the network device may consider whether a sampled traffic flow's aggregated outlier-related classification exceeds a threshold value. Accordingly, those sampled traffic flows whose aggregated outlier-related classifications exceed the threshold value may be included in the top outlier subset.

The network device may then process traffic flows based on the aggregated outlier-related classifications for the one or more sampled traffic flows. For example, the network device may process traffic flows which belong to the top outlier subset using precautionary actions than it does not use for other traffic flows. These precautionary actions may include any one, or combination of: (1) re-routing a traffic flow to a firewall; (2) re-authenticating a traffic flow; (3) dropping a traffic flow from a network; and (4) providing information associated with the traffic flow to a user interface (which may be viewed by, e.g., a network administrator). As described above, because outlier detection is being performed at the network device level in relatively short sub-time windows, examples may take precautionary actions to remediate malicious/problematic activity more quickly than other technologies.

Length of the Sub-time Windows: As described above, by partitioning a defined time window into relatively short sub-time windows (e.g. 10 minutes, 5 minutes, 1 minute, 30 seconds, 2 seconds, etc.), examples may optimize/improve outlier detection by reducing average value convergence. As used herein, average value convergence may refer to the tendency of average behavioral characteristic values for different sampled traffic flows to converge to common/similar values over time. As FIG. 1 will illustrate, by reducing average value convergence, examples may improve outlier detection.

FIG. 1 is a diagram illustrating an example scenario where a network device transfers traffic flows between computers/devices on different networks.

In FIG. 1, network device 102 connects computers on bank network 100 (e.g. bank computers 110, 112, and 114) to customer devices external to bank network 110 (e.g. customer devices 120, 122, 124, and 126).

In the illustrated example, bank computers may communicate with customer devices via a customer service chat application. There will be a traffic flow associated with each chat (e.g. traffic flows 130, 132, 134, and 136). In particular, each traffic flow may correspond to a sequence of chat messages sent from a particular bank network computer to a particular customer device (in other examples, the customer service chat application may be replaced by a financial transaction application, and each financial transaction may correspond to a traffic flow). Here, each chat message sent from a bank computer to a customer device may correspond to a data packet. These data packets/chat messages may have a typical packet length (e.g. 200-500 bytes).

Network device 102 may sample traffic flow data, and assign outlier-related classifications to one or more sampled traffic flows, in the same/similar manner as described above. In this simplified example, network device 102 has sampled traffic flows 130, 132, 134, and 136 (in various examples a network device may sample many additional traffic flows).

As described above, network device 102 may assign outlier-related classifications to the sampled traffic flows in a given time window based on the relative behavioral characteristics of the sampled traffic flows. In this simplified example, network device 102 will consider how the sampled traffic flows compare across one behavioral characteristic—mean packet length.

In an example one hour time window, traffic flow 130 (i.e. "the suspicious traffic flow") may include two very long data packets (e.g. 1000 bytes or larger), and numerous very short data packets (e.g. 50 bytes or less). By contrast, traffic flows 132, 134, and 136 may all include data packets of approximately the same lengths, which are shorter than the two long data packets of traffic flow 130, but longer than the numerous very short data packets of traffic flow 130. For example, the data packets for traffic flows 132, 134, and 136 may all be between 200-500 bytes.

The two long data packets of traffic flow 130 may indicate that the chat application on bank computer 100 was used to send two large files. This would be an atypical use for the customer service chat application, and may indicate suspicious activity. Similarly, the numerous very short packets of traffic flow 130 may also indicate atypical/suspicious use of the chat application. By contrast, the relatively short/consistent length of the data packets associated with traffic flows 132, 134, and 136 may indicate that the chats associated with these traffic flows correspond to typical/non-suspicious uses of the chat application.

If network device 102 considers mean packet length across the entire one hour window, the mean packet length for traffic flow 130 may not deviate significantly from the mean packet lengths for the other sampled traffic flows. This is because traffic flow 130 has (a) two packets which are much longer than the typical packets of traffic flows 132, 134, and 136, and (b) numerous packets which are relatively shorter than the typical data packets for traffic flows 132, 134, and 136. Thus, the mean packet length for traffic flow 130 may be the same/similar as the mean packet length for the other sampled traffic flows. Accordingly, because network device 102 assigns outlier-related classifications to the sampled traffic flows based on mean packet length, network device 102 may not classify traffic flow 130 as an outlier in this one hour time window. Put another way, because the mean packet length for traffic flow 130 converged to a non-outlier value over the one hour time window, network device 102 may not classify traffic flow 130 as an outlier.

Here (as may be true in other cases), partitioning the one hour time window into short sub-time windows (e.g. 10 minutes or less) can improve outlier detection by reducing average value convergence. For example, if the one hour time window were partitioned into 30, two minute sub-time windows, traffic flow 130 would likely be classified as an outlier during the sub-time windows where it included the abnormally long data packets. In particular, in these sub-time windows the mean packet length for the traffic flow 130 would be significantly longer than the mean packet length of other sampled traffic flows. Traffic flow 130 would also likely be classified as an outlier in the sub-time windows where it included the abnormally short data packets. In particular, traffic flow 130's mean packet length may have been less than the mean packet length of the other sampled traffic flows in these sub-time windows.

Multiple Sub-time Windows: As the length of a sub-time window decreases, average value convergence may be reduced, and examples may tend to classify a greater number/proportion of traffic flows as outliers within the given sub-time window. In some cases, this may result in false positives (e.g. examples may classify certain traffic flows as outliers for particular time windows, when their underlying activity is not malicious/problematic). Accordingly, certain benign traffic flows (i.e. traffic flows which are not associated with malicious/problematic activity) may be re-routed to a firewall, re-authenticated, dropped from the network, etc. This may have a negative impact on network communication.

Accordingly, in certain applications it may be advantageous to use multiple sub-time windows to reduce the occurrence of false positives. Here, the basic idea is that the traffic flows which are associated with malicious/problematic activity (e.g. hacking, malfunctioning equipment, etc.) are likely to exhibit outlier-type behavior across a greater number of sub-time windows than traffic flows which are associated with benign activity. Referring again to the example described in conjunction with FIG. 1, traffic flows 132, 134, and 136 may be classified as outliers in a few sub-time windows (e.g. 1-5 sub time windows). However, by aggregating outlier-related classifications across multiple sub-time windows, network device 102 may identify traffic flow 130 as a true outlier for the entire one hour time window because it was classified as an outlier more times than the other sampled traffic flows (e.g. 26 times vs 1-5 times). Accordingly, network device 102 may process traffic flow 130 using precautionary actions than it does not use for other traffic flows (e.g. re-routing traffic flow 130 to a firewall; re-authenticating traffic flow 130; dropping traffic flow 130 from bank network 100; or providing information associated with traffic flow 130 to a user interface).

In summary, by analyzing sampled traffic flows in short sub-time windows, examples of the presently disclosed technology may reduce average value convergence. By reducing average value convergence, examples may identify a greater number/proportion of sampled traffic flows as outliers in a given sub-time window. Accordingly, in order to reduce the occurrence of false positives (i.e. instances where a sampled traffic flow is classified as an outlier, when its underlying activity is not malicious/problematic), examples aggregate outlier-related classifications across multiple sub-time windows. Said differently, examples may reduce the occurrence of false positives by looking at "the big picture" before deciding to process as a traffic flow as a "true" outlier.

Figure 2:
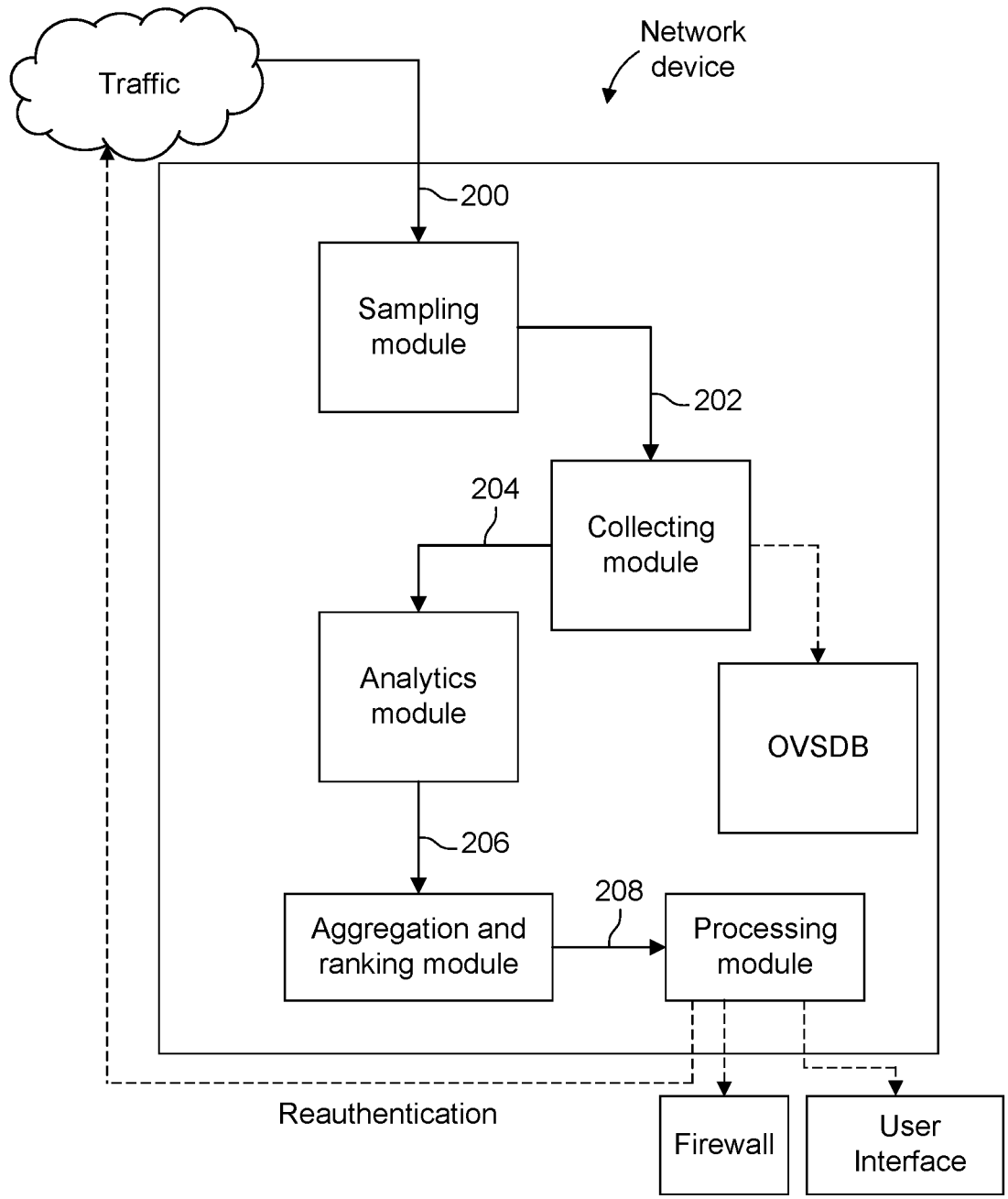
FIG. 2 is a flowchart illustrating example operations that can be performed to detect outlier traffic flow behavior across multiple sub-time windows.

FIG. 2 is a flowchart illustrating example operations that can be performed to detect outlier traffic flow behavior across multiple sub-time windows.

At operation 200, a sampling module samples traffic flow data transferred by a network device during a defined time window (e.g. one hour, 30 minutes, etc.). The sampling module may be implemented as part of the network device. For example, the sampling module may be a software application (e.g. HPE's sFlow application) which has been installed at the network device.

In various examples, the time window may be defined by a network administrator or a machine learning algorithm. As described above, the defined time window may be partitioned into two or more sub-time windows. These sub-time windows may each be a subset of the complete defined time window. In certain examples, these sub-time windows may be relatively short (e.g. 10 minutes, 5 minutes, 1 minute, 30 seconds, 2 seconds, etc.) in order to reduce average value convergence and improve outlier detection.

The traffic flow data may include information associated with all of the traffic flows transferred by the network device (e.g. a router, a switch, a gateway, etc.) during the defined time window. Accordingly, the traffic flow data sample may include information associated with a sampled subset of those traffic flows. Here, traffic flows may be sampled because it would require an enormous amount of memory to analyze every traffic flow transferred by the network device during the defined time window.

As described above, the traffic flow data sample may include information associated with a sampled subset of all the traffic flows transferred by the network device in the defined time window. The information associated with each sampled traffic flow may include one or more identifying characteristics, and one or more behavioral characteristics.

An identifying characteristic may be any characteristic which can be used to identify a traffic flow. For example, an identifying characteristic may comprise any one, or combination of: (1) source Internet Protocol (IP); (2) destination IP; (3) source port; (4) destination port; (5) IP protocol; and (6) other identifying characteristics. In certain examples, a network administrator (or a machine learning algorithm) may tailor the identifying characteristics which are recorded/examined depending on the network they are managing. For example, at a call center, a machine learning algorithm may learn that identifying characteristics associated with a traffic flow's source may be of more value for outlier detection than characteristics associated with the traffic flow's destination (this may be because inbound traffic flows may be directed to the same set of destinations at random). The machine learning algorithm at the call center may tailor the identifying characteristics which are recorded/examined accordingly.

A behavioral characteristic may be any characteristic which can be used to characterize the behavior of a traffic flow during a particular sub-time window. For example, a behavioral characteristic may comprise any one, or combination of (1) data packet volume (i.e. the total number of bytes exchanged per packet); (2) mean packet length; (3) median packet length; (4) minimum packet length; (5) maximum packet length; (6) total number of packets; and (7) other behavioral characteristics. As with identifying characteristics, a network administrator (or machine learning algorithm) may tailor the behavioral characteristics which are recorded/examined in a manner which improves/optimizes outlier detection for their network (this may be a manual process, or it may be automated). For example, a machine learning algorithm for a bank may learn that large data packets often characterize hacking attacks. Accordingly, the machine learning algorithm may automatically tailor the behavioral characteristics which are being recorded/examined around characteristics that track packet length (e.g. maximum packet length, mean packet length, etc.).

In certain examples, the sampled traffic flow data may be comprised of the individual data packets which make up the sampled traffic flows. The sampling module may sample the data packets which comprise a sampled traffic flow using a software application such as HPE's sFlow. The software application may accomplish this by sampling data packets which have the same header information (e.g. "Source IP address, Destination IP address"). As will be described below, a collecting module may then construct these data packets into the "sampled traffic flows" using the same/similar software application. For example, HPE's sFlow (or other similar applications) may be used to (1) sample the data packets which comprise a sampled traffic flow, and (2) construct the sampled traffic flow from the sampled data packets.

At operation 202, the sample of traffic flow data is collected by a collecting module. Like the sampling module, the collecting module may be implemented as part of the network device that the traffic flow data is streaming through. For example, the collecting module may be a software application (e.g. HPE's sFlow) which has been installed at the network device.

In certain examples, the collecting module may save the sampled traffic flow data locally in a network device's Open vSwitch Database (OVSDB). As used herein, an OVSDB may refer to a network-accessible database system. Schemas in OVSDB may specify tables and column types in a database, and can include data, uniqueness, and referential integrity constraints.

In some examples, the collecting module may convert raw traffic flow data sampled by the sampling module into a dataset which may be analyzed by the analytics module. As described above, in certain examples, this may involve constructing traffic flows from sampled data packets using a software application such as HPE's sFlow.

The dataset created by the collecting module may describe the one or more identifying characteristics and the one or more behavioral characteristics of the sampled traffic flows in an analyzable format. In certain examples, the collecting module may utilize a software application such as pandas (or other similar databases/conversion applications) for this conversion. An example of an analyzable dataset which includes various identifying and behavioral characteristics of sampled traffic flows is displayed below. Here, each row of the example dataset corresponds to a sampled traffic flow and each column corresponds to either a identifying or behavioral characteristic. This dataset corresponds to a single sub-time window. Accordingly, there may be similar datasets for each sub-time window.

| Destination IP | Source IP | Total # of Packets | Mean Packet Length | Minimum Packet Length |
|---|---|---|---|---|
| 172.31.255.255 | 131.31.25.255 | 1 | 176 | 176 |
| 94.43.781.109 | 22.105.205.14 | 1 | 213 | 213 |
| 140.76.32.123 | 62.35.85.123 | 2 | 78 | 69 |
| 43.141.16.166 | 920.45.305 | 1 | 514 | 514 |
| 194.153.68.23 | 22.105.89.111 | 3 | 65 | 53 |
| 111.147.53.176 | 237.995.444 | 1 | 183 | 183 |
| 43.153.82.180 | 38.174.5.233 | 1 | 197 | 97 |
| 57.183.188.45 | 52.105.230.89 | 4 | 53 | 44 |
| 114.53.100.22 | 62.35.105.222 | 2 | 87 | 82 |
| 104.3.78.244 | 108.78.108.76 | 1 | 103 | 103 |

At operation 204, an analytics module assigns outlier-related classifications to one or more sampled traffic flows. In certain examples, the analytics module may be a machine learning algorithm implemented at the network device. In some examples, this machine learning algorithm may be an unsupervised machine learning algorithm. Here, unsupervised machine learning may be used because of its ability to dynamically group data based on behaviors.

An outlier-related classification may refer to a classification assigned to a sampled traffic flow which either (a) classifies a sampled traffic flow as an outlier or not an outlier; or (b) quantifies how much of an outlier a sampled traffic flow is compared to other sampled traffic flows. For example, the analytics module may assign outlier-related classifications on a numerical scale (e.g. 0=not an outlier; 1=small outlier; 2=medium outlier; 3=larger outlier; etc.).

As described above, the defined time window may be partitioned into two or more sub-time windows. Accordingly, the analytics module may assign a sampled traffic flow an outlier-related classification in one or more sub-time windows. For example, if a defined time window of one hour is partitioned into 30, two minute sub-time windows, the analytics module may assign an outlier-related classification to the sampled traffic flow in each of the 30, two minute sub-time windows.

In certain examples, the analytics module may assign a given sampled traffic flow an outlier-related classification based on the relative behavioral characteristics of the sampled traffic flows during a sub-time window. This may comprise comparing one or more behavioral characteristics of the given sampled traffic flow to corresponding behavioral characteristics of the other sampled traffic flows. For example, the analytics module may compare the minimum packet length for a given traffic flow to the minimum packet length of the other sampled traffic flows.

In certain examples, comparing a behavioral characteristic of a given sampled traffic flow to the corresponding behavioral characteristic of the other sampled traffic flows may comprise comparing the behavioral characteristic of the given sampled traffic flow to an average value (e.g. mean, median, or mode) for the behavioral characteristic for the sample. For example, if there are 4 sampled traffic flows, the first sampled traffic flow may have a minimum packet length of 200 bytes, the second sampled traffic flow may have a minimum packet length of 210 bytes, the third sampled traffic flow may have a minimum packet length of 220 bytes, and the fourth sampled traffic flow may have a minimum packet length of 230 bytes. The average (in this case mean) value for minimum packet length for the sample may be calculated as follows: (200+210+220+230)/4=215 bytes. Accordingly, the minimum packet length for each sampled traffic flow may be compared to the average value for minimum packet length for the sample. When assigning an outlier-related classification to the first sampled traffic flow, the analytics module may consider that the minimum packet length for the first sampled traffic flow (i.e. 200 bytes) deviates from the average value for the sample (i.e. 215 bytes) by 15 bytes. By contrast, the minimum packet length for the second sampled traffic flow (i.e. 210 bytes) only deviates from the average value for the sample by 5 bytes. Accordingly, the analytics module may classify the first sampled traffic flow as more of an outlier than the second sampled traffic flow.

As illustrated above, the analytics module may assign an outlier-related classification to a given traffic flow based on the amount it deviates from an average behavioral characteristic value for the sample. In a simple binary classification example, the analytics module may classify the given traffic flow as (a) an outlier if the amount of deviations exceeds a threshold value (this threshold value may be determined by the analytics module, or a network administrator); or (b) not an outlier if the amount of deviation is less than or equal to the threshold value. In a more nuanced example, the analytics module may assign an outlier-related classification to a given sampled traffic flow on a "sliding scale" (i.e. a numerical scale) which quantifies an amount of deviation from an average behavioral characteristic value for the sample. For example, using the illustration from the previous paragraph, the first sampled traffic flow may be assigned an outlier-related classification of 15 (as it deviates from the average value for the sample by 15 bytes) and the second sampled traffic flow may be assigned an outlier-related classification of 5 (as it deviates from the average value for the sample by 5 bytes).

In certain examples the analytics module may consider how a sampled traffic flow compares across multiple behavioral characteristics. In turn, these comparisons may be used to assign an outlier-related classification to the sampled traffic flow in a given sub-time window. In another example, the analytics module may consider a standard deviation for a particular behavioral characteristic for the sample. For example, in a first sub-time window, the average minimum packet length for a sample may be 175, with a standard deviation of 50. In this sub-time window, a traffic flow which had a minimum packet length of 130 may not be classified as an outlier because it is within a standard deviation of the mean value for the sample. By contrast, in a second sub-time window, the average minimum packet length for a sample may be 175, with a standard deviation of 5. Here, a traffic flow which had a minimum packet length of 130 may be classified as an outlier because it lies far outside of the standard deviation for the sample.

At operation 206, an aggregation and ranking module aggregates the outlier-related classifications for one or more sampled traffic flows during the defined time window.

As described above, the basic idea behind aggregating outlier-related classifications across multiple sub-time windows is that the traffic flows associated with malicious/problematic activity (e.g. hacking, malfunctioning equipment, etc.) are likely to exhibit outlier type behavior across a greater number of sub-time windows than traffic flows which are associated with benign activity.

Referring again to FIG. 2, either during, or upon completion of the defined time window, the aggregation and ranking module may aggregate the outlier-related classifications for one or more sampled traffic flows. For example, if the analysis module assigned outlier-related classifications using a simple binary classification approach (i.e. outlier or not outlier), the aggregation and ranking module may count the number of times each sampled traffic flow was classified as an outlier. If the analysis module assigned outlier-related classifications using a sliding scale type approach (e.g. in each time window it assigned a sampled traffic flow a numerical value which corresponds to how much of an outlier the traffic flow was), the aggregation and ranking module may sum the outlier-related classifications for each sampled traffic flow.

Based on the aggregated outlier-related classifications for the sampled traffic flows, the aggregation and ranking module may define a subset of sampled traffic flows as "top outliers" for the defined time window. This subset of top outliers may comprise the subset of sampled traffic flows which have higher aggregated outlier-related classifications than sampled traffic flows which are not included in the top outlier subset. The aggregation and ranking module may consider any number of factors when defining this top outlier subset.

In some examples, the aggregation and ranking module may consider whether the aggregated outlier-classification for a sampled traffic flow exceeds a threshold value. For example, in a defined time window of one hour, with 30 two-minute sub-time windows, a first sampled traffic flow may have an aggregated outlier-related classification of 16 (this may indicate that the first sampled traffic flow was classified as an outlier in 16 of the 30 sub-time windows). A second sampled traffic flow may have an aggregated outlier-related classification of 2, and a third sampled traffic flow may have an aggregated outlier-related classification of 25. The threshold value/dividing line for defining the top-outlier subset may be 18 (this threshold/dividing line may be pre-defined, or determined by the aggregation and ranking module using machine learning techniques). Accordingly, only the third sampled traffic flow would be defined as a top outlier because its aggregated outlier-related classification of 25 exceeds the threshold value/dividing line of 18.

In other examples, the aggregation and ranking module may define the top outlier subset based on number. For example, the aggregation and ranking module may define the top outlier subset as the 10 sampled traffic flows with the highest aggregated outlier-classifications. In another example, the aggregation and ranking module may define the top outlier subset as the 150 sampled traffic flows with the highest aggregated outlier-classifications.

At operation 208, a processing module processes traffic flows based on the aggregated outlier-related classifications for the sampled traffic flows. For example, the processing module may process traffic flows which belong to the top outlier subset using precautionary actions than it does not use for other traffic flows. These precautionary actions may include any one, or combination of: (1) re-routing a traffic flow to a firewall; (2) re-authenticating a traffic flow; (3) dropping a traffic flow from a network; and (4) providing information associated with the traffic flow to a user interface (which may be viewed by, e.g., a network administrator).

Figure 3:
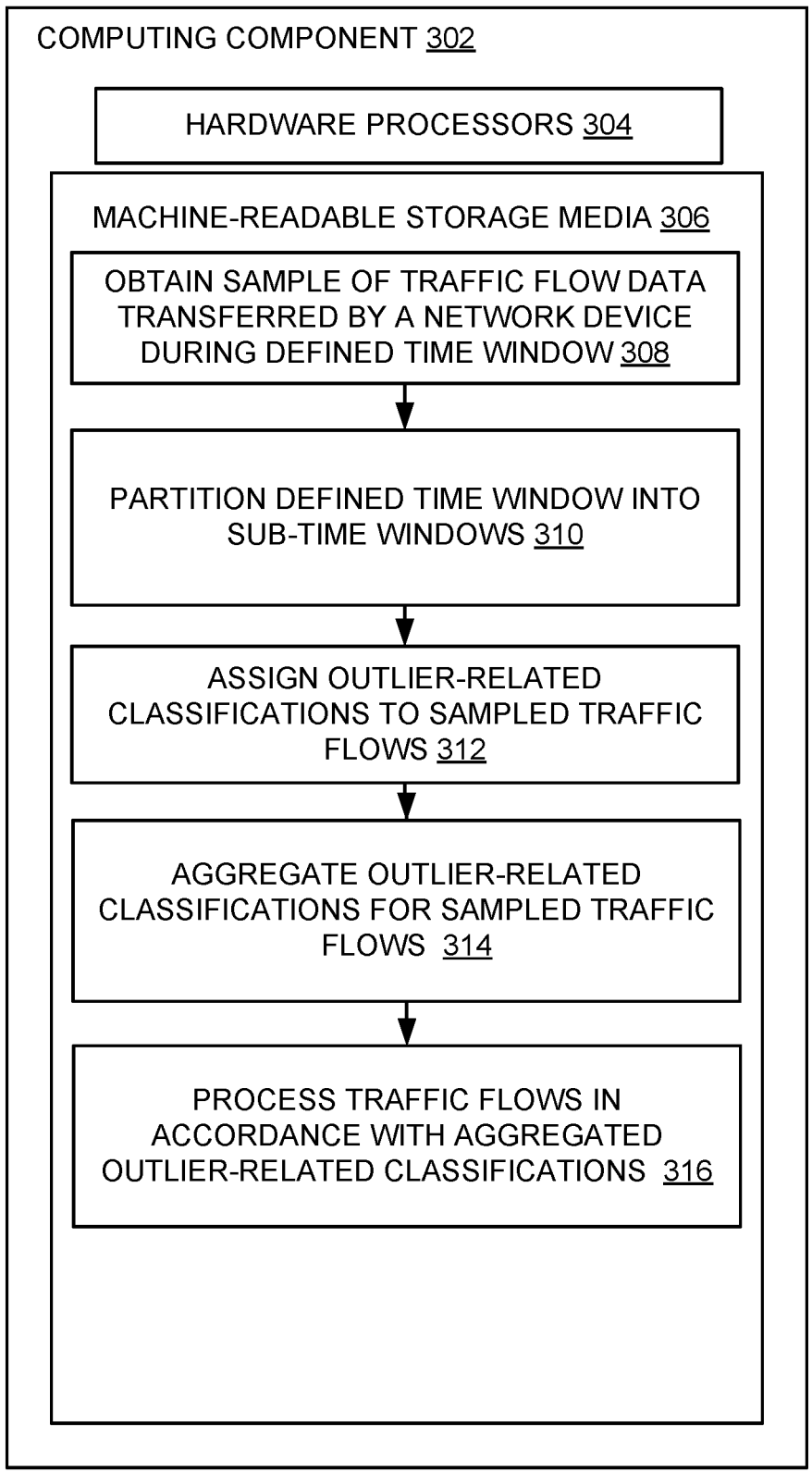
FIG. 3 illustrates an example iterative process performed by a computing system for detecting outlier traffic flow behavior across multiple sub-time windows.

FIG. 3 illustrates an example iterative process performed by a computing system 300 for detecting outlier traffic behavior across multiple sub-time windows. Computing system 300 may be comprised of one or more computing components, such as computing component 302. Computing component 302 may be, for example, a server computer, a controller, or any other similar computing component capable of processing data. In the example implementation of FIG. 3, the computing component 302 includes a hardware processor 304, and machine-readable storage medium 306.

Hardware processor 304 may be one or more central processing units (CPUs), semiconductor-based microprocessors, and/or other hardware devices suitable for retrieval and execution of instructions stored in machine-readable storage medium 306. Hardware processor 304 may fetch, decode, and execute instructions, such as instructions 308-316, to control processes or operations for optimizing the system during run-time. As an alternative or in addition to retrieving and executing instructions, hardware processor 304 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 306, may be any electronic, magnetic, optical, or other physical storage device that contains or stores executable instructions. Thus, machine-readable storage medium 306 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 306 may be a non-transitory storage medium, where the term "non-transitory" does not encompass transitory propagating signals. As described in detail below, machine-readable storage medium 306 may be encoded with executable instructions, for example, instructions 308-316.

Hardware processor 304 may execute instruction 308 to obtain a sample of traffic flow data during a defined time window. The sample of traffic flow data may comprise information associated with a sampled subset of all the traffic flows transferred by a network device in the defined time window. In certain examples, computing system 300 may be implemented on this network device.

A sampled traffic flow may have one or more behavioral characteristics (as described in conjunction with FIG. 2). For example, these behavioral characteristics may include any one, or combination of: (1) data packet volume; (2) mean data packet length; (3) median data packet length; (4) minimum data packet length; (5) maximum data packet length; (6) total number of data packets; and (7) other behavioral characteristics.

In certain examples, a sampled traffic flow may also have one or more identifying characteristics (as described in conjunction with FIG. 2). For example, these identifying characteristics may include any one, or combination of: (1) source Internet Protocol (IP); (2) destination IP; (3) source port; (4) destination port; (5) IP protocol; and (6) other identifying characteristics.

Hardware processor 304 may execute instruction 310 to partition the defined time window into two or more sub-time windows. The longer defined time window may be partitioned into shorter sub-time windows in order to reduce average value convergence. By reducing average value convergence, hardware processor 304 may improve outlier detection by, e.g., increasing the number of traffic flows it classifies as outliers in a given sub-time window.

In certain examples, hardware processor 304 may use a sub-time window determining ("STWD") machine learning algorithm to determine a length/number of sub-time windows which improves outlier detection. In certain examples, improving outlier detection may correspond to maximizing the number of sampled traffic flows which are classified as outliers. For example, in a first half-hour, the STWD machine learning algorithm may partition the half-hour window into 3, ten-minute sub-time windows. At the end of the half-hour window, the STWD machine learning algorithm may observe that on average, 25 sampled traffic flows were classified as outliers per sub-time window. In a second half-hour, the STWD machine learning algorithm may partition the half-hour window into 6, five-minute sub-time windows. At the end of the second half-hour window, the STWD machine learning algorithm may observe that on average, 68 sampled traffic flows were classified as outliers per sub-time window. In a third half-hour, the STWD machine learning algorithm may partition the half-hour window into 10, three-minute sub-time windows. At the end of the third half-hour window, the STWD machine learning algorithm may observe that on average, 75 sampled traffic flows were classified as outliers per sub-time window. The STWD machine learning algorithm may then repeat the test for the 3 different sub-time windows (i.e. 10, 5, and 3 minutes), and observe how many sampled traffic flows were classified as outliers per sub-time window. Based on these observations, the STWD machine learning algorithm may learn that, e.g., the most sampled traffic flows were classified as outliers per sub-time window in the three-minute sub-time windows. Accordingly, the STWD machine learning algorithm may learn that a three-minute sub-time window is the sub-time window length which maximizes outlier detection for that application.

Once the defined time window has been partitioned into two or more sub-time windows, in at least one sub-time window, hardware processor 304 may execute instruction 312 to use an outlier classification machine learning algorithm to assign an outlier-related classification to one or more of the sampled traffic flows based on the relative behavioral characteristics of the sampled traffic flows. This may be done in the same/similar manner as described in conjunction with FIGS. 1 and 2. As described above, hardware processor 304 may compare one or more behavioral characteristics of a traffic flow to corresponding behavioral characteristics of other sampled traffic flows. For example, hardware processor 304 may compare (1) the minimum packet length for a given traffic flow to the minimum packet length of the other sampled traffic flows; and (2) the total number of packets for the given traffic flow to the total number of packets of the other sampled traffic flows. In certain examples, this may comprise comparing the minimum packet length and total number of packets for the given traffic flow to average values (e.g. mean, median, or mode) for the other sampled traffic flows. In these examples, hardware processor 304 may assign an outlier-related classification to the given traffic flow based on the magnitude of its deviation from either or both of these average values. In a simple binary classification example, the analytics module may classify the given traffic flow as (a) an outlier if the magnitude of deviation exceeds a threshold value; or (b) not an outlier if the magnitude of deviation is less than or equal to the threshold value. In a more nuanced example, hardware processor 304 may assign an outlier-related classification to a given traffic flow on a sliding scale which measures the given traffic flow's magnitude of deviation from an average value. In certain examples hardware processor 304 may consider standard deviations for the sample as well.

Hardware processor 304 may execute instruction 314 to aggregate the outlier-related classifications for one or more sampled traffic flows during the defined time window. By aggregating outlier-related classifications across multiple sub-time windows, hardware processor 304 may improve outlier detection accuracy. Here, the basic idea is that the traffic flows which are associated with malicious/problematic activity (e.g. hacking, malfunctioning equipment, etc.) are likely to exhibit outlier type behavior across a greater number of sub-time windows than traffic flows which are associated with benign activity.

Hardware processor 304 may aggregate outlier-related classifications in any number of ways. For example, if a simple binary classification approach has been used (i.e. outlier or not outlier), hardware processor 304 may count the number of sub-time windows that each traffic flow has been classified as an outlier. If a sliding scale type outlier classification has been used (e.g. in each time window each sampled traffic flow is assigned a numerical value which corresponds to how much of an outlier the traffic flow is), outlier-related classifications for each sampled traffic flow may be summed.

In certain examples, hardware processor 304 may also define a subset of sampled traffic flows as top outliers for the defined time window based on the aggregated outlier-related classifications for the sampled traffic flows. As described in conjunction with FIG. 2, hardware processor 304 may consider any number of factors when defining this subset. For example, hardware processor 304 may consider whether the aggregated outlier-related classifications for a given sampled traffic flow exceeds a threshold value (here this threshold value may be pre-selected by a network administrator, or determined by a machine learning algorithm). Accordingly, those traffic flows whose aggregated outlier-related classifications exceed the threshold may be included in the "top outlier" subset.

Hardware processor 304 may execute instruction 316 to process traffic flows based on the aggregated outlier-related classifications for the sampled traffic flows. For example, hardware processor 304 may process traffic flows with higher aggregated outlier-related classifications using precautionary actions than it does not use for traffic flows with lower aggregated outlier-related classifications. These precautionary actions may include any one, or combination of: (1) re-routing a traffic flow to a firewall; (2) re-authenticating a traffic flow; (3) dropping a traffic flow from a network; and (4) providing information associated with the traffic flow to a user interface (which may be viewed by e.g. a network administrator).

Figure 4:
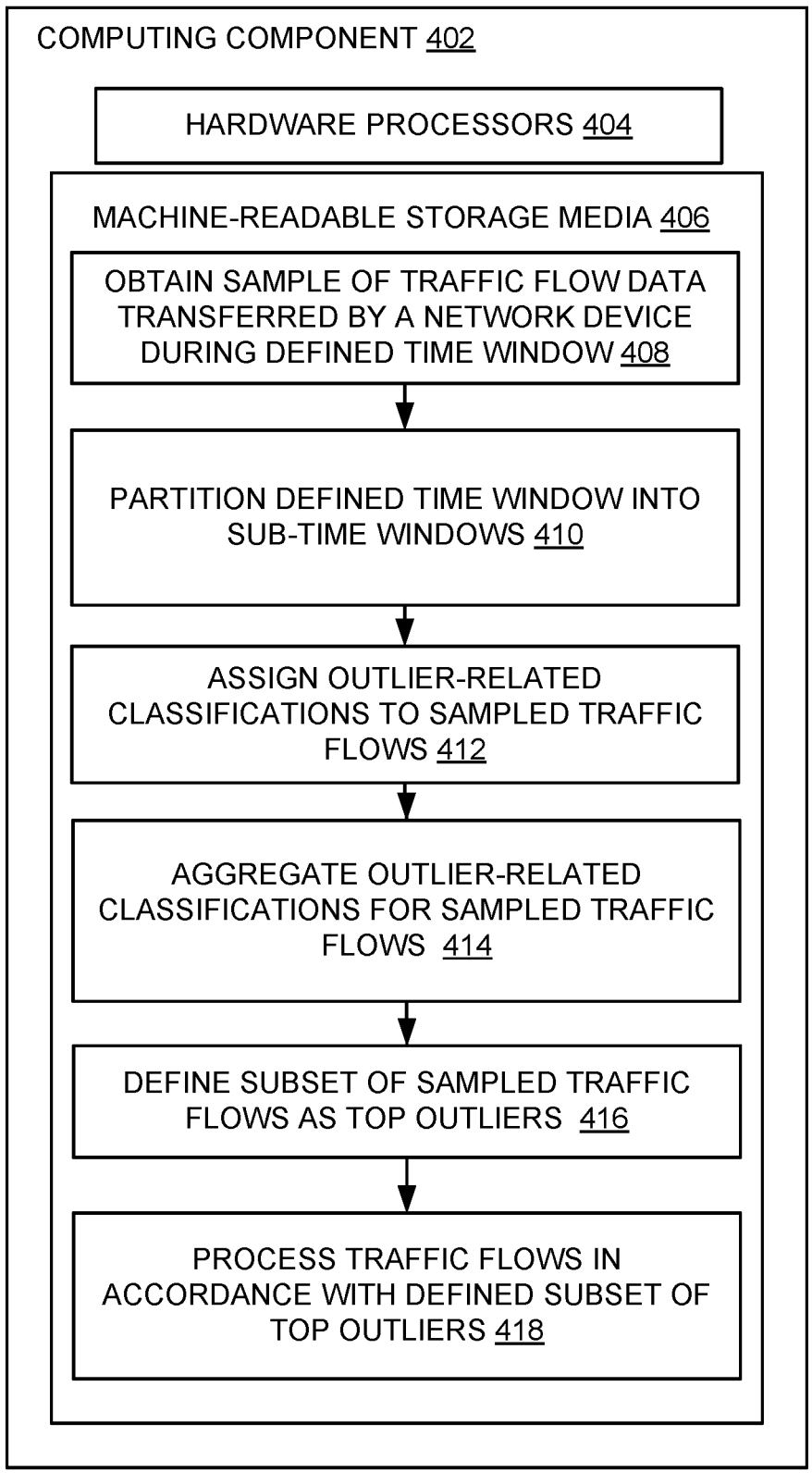
FIG. 4 illustrates an example iterative process performed by a computing system for detecting outlier traffic flow behavior across multiple sub-time windows.

FIG. 4 illustrates an example iterative process performed by a computing system 400 for detecting outlier traffic behavior across multiple sub-time windows.

Computing system 400 may be comprised of one or more computing components, such as computing component 402. Like computing component 302, computing component 402 may be, for example, a server computer, a controller, or any other similar computing component capable of processing data. In the example implementation of FIG. 4, the computing component 402 includes a hardware processor 404, and machine-readable storage medium 406. Here, hardware processor 404 and machine-readable storage medium 406 may be the same as/similar to hardware processor 304 and machine-readable storage medium 306 respectively. Accordingly, hardware processor 404 may fetch, decode, and execute instructions, such as instructions 408-418.

Hardware processor 404 may execute instruction 408 to obtain a sample of traffic flow data during a defined time window. The sample of traffic flow data may comprise information associated with a sampled subset of traffic flows transferred by a network device in the defined time window. In certain examples, computing system 400 may be implemented on this network device. Hardware processor 404 may obtain the sample of traffic flow data in the same/similar manner as described in conjunction with FIG. 3.

Hardware processor 404 may execute instruction 410 to partition the defined time window into two or more sub-time windows. This may be done in the same/similar manner as described in conjunction with FIG. 3.

Once the defined time window has been partitioned into two or more sub-time windows, in at least one sub-time window, hardware processor 404 may execute instruction 412 to use an outlier-related classification machine learning algorithm to assign each sampled traffic flow an outlier-related classification based on the relative behavioral characteristics of the sampled traffic flows. This may be done in the same/similar manner as described in conjunction with FIG. 3.

Hardware processor 404 may execute instruction 414 to aggregate the outlier-related classifications for each traffic flow during the defined time window. This may be done in the same/similar manner as described in conjunction with FIG. 3.

Hardware processor 404 may execute instruction 416 to define a subset of sampled traffic flows as top outliers for the defined time window based on the aggregations. As described in conjunction with FIGS. 2 and 3, hardware processor 404 may consider any number of factors in when defining this subset. For example, hardware processor 304 may consider whether the aggregated outlier-related classifications for a given sampled traffic flow exceeds a threshold value (here this threshold value may be pre-selected by a network administrator, or determined by a machine learning algorithm). Accordingly, those traffic flows whose aggregated outlier-related classifications exceed the threshold may be included in the "top outlier" subset.

Hardware processor 404 may execute instruction 418 to process traffic flows based on the defined subset of top outlier traffic flows. For example, the processing module may process traffic flows which belong to the "top outlier" subset using precautionary actions than it does not use for other traffic flows. These precautionary actions may include any one, or combination of: (1) re-routing a traffic flow to a firewall; (2) re-authenticating a traffic flow; (3) dropping a traffic flow from a network; and (4) providing information associated with the traffic flow to a user interface (which may be viewed by e.g. a network administrator).

Figure 5:
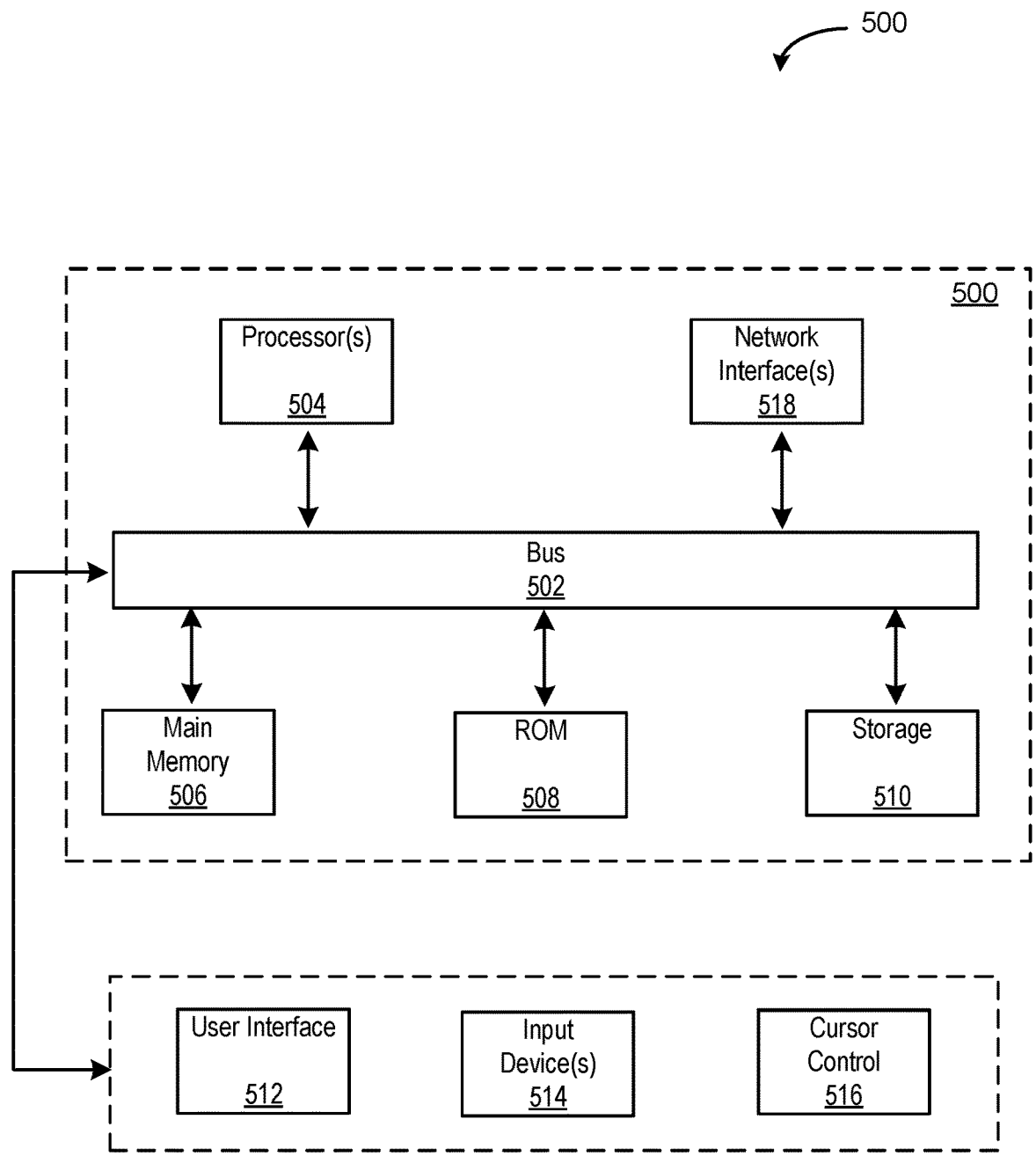
FIG. 5 is an example computing system that may be used to implement various features of examples described in the present disclosure.

FIG. 5 depicts a block diagram of an example computing system 500 in which various of the examples described herein may be implemented. The computing system 500 includes a bus 502 or other communication mechanism for communicating information, one or more hardware processors 504 coupled with bus 502 for processing information. Hardware processor(s) 504 may be, for example, one or more general purpose microprocessors.

The computing system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computing system 500 into a special-purpose machine that is customized to perform the operations specified in the instructions.

The computing system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computing system 500 may be coupled via bus 502 to a user interface 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on user interface 512. In some examples, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computing system 500 may implement the techniques described herein using customized hard-wired logic, one or more ASICs or FPGAs, firmware and/or program logic which in combination with the computing system causes or programs computing system 500 to be a special-purpose machine. According to one example, the techniques herein are performed by computing system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computing system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computing system 500, are example forms of transmission media.

The computing system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computing systems or computer processors comprising computer hardware. The one or more computing systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example examples. The performance of certain of the operations or processes may be distributed among computing systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computing system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

The terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

What is claimed is:

1. A method comprising:
obtaining a sample of traffic flow data during a defined time window, wherein:
the sample of traffic flow data comprises information associated with a sampled subset of all traffic flows transferred by a network device in the defined time window, and
the sampled traffic flows have one or more behavioral characteristics;
partitioning the defined time window into two or more sub-time windows;
in at least one sub-time window, using an outlier classification machine learning algorithm to assign an outlier-related classification to one or more of the sampled traffic flows based on relative behavioral characteristics of the sampled traffic flows; and
aggregating the outlier-related classifications for one or more sampled traffic flows during the defined time window.

2. The method of claim 1, further comprising, processing traffic flows based on the aggregated outlier-related classifications for one or more sampled traffic flows.

3. The method of claim 2, further comprising, defining a subset of the sampled traffic flows as top outliers for the defined time window based on the aggregated outlier-related classifications for one or more sampled traffic flows.

4. The method of claim 2, wherein processing traffic flows based on the aggregated outlier-related classifications for one or more sampled traffic flows comprises providing information associated with the top outliers to a user interface.

5. The method of claim 2, wherein the one or more behavioral characteristics comprise at least one of the following:
   data packet volume;
   mean data packet length;
   median data packet length;
   minimum data packet length;
   maximum data packet length; and
   total number of data packets.

6. The method of claim 2, wherein one or more of the sampled traffic flows also comprise one or more identifying characteristics, the identifying characteristics comprising at least one of the following:
   source Internet Protocol (IP);
   destination IP;
   source port;
   destination port; and
   IP protocol.

7. The method of claim 2, wherein the two or more sub-time windows are equal in length, and are each ten minutes or less.

8. The method of claim 2, wherein the length of the two or more sub-times windows is determined using a sub-time window length determining machine learning algorithm.

9. The method of claim 8, wherein the length of the two or more sub-time windows maximizes the number of sampled traffic flows which are classified as outliers per sub-time window.

10. The method of claim 8, wherein the outlier classification machine learning algorithm is an unsupervised machine learning algorithm.

11. A network device comprising at least one processor; and
   a memory storing instructions that, when executed by the at least one processor, cause the system to perform a method comprising:
      obtaining a sample of traffic flow data during a defined time window, wherein:
         the sample of traffic flow data comprises information associated with a sampled subset of all traffic flows transferred by the network device in the defined time window, and
         each sampled traffic flow has one or more behavioral characteristics;
      partitioning the defined time window into two or more sub-time windows;
      in at least one sub-time window, using an outlier classification machine learning algorithm to assign an outlier-related classification to one or more sampled traffic flows based on relative behavioral characteristics of the sampled traffic flows;
      aggregating the outlier-related classifications for one or more sampled traffic flows during the defined time window;
      defining a subset of the sampled traffic flows as top outliers for the defined time window based on the aggregated outlier-related classifications for one or more sampled traffic flows; and
      processing traffic flows based on the defined subset of top outliers.

12. The network device of claim 11, wherein processing traffic flows based on the defined subset of top outliers comprises at least one of the following:
   providing information associated with the top outliers to a user interface;
   reauthenticating the top outliers; and
   re-routing the top outliers to a firewall.

13. The network device of claim 12, wherein the one or more behavioral characteristics comprise at least one of the following:
   data packet volume;
   mean data packet length;
   median data packet length;
   minimum data packet length;
   maximum data packet length; and
   total number of data packets.

14. The network device of claim 13, wherein each sampled traffic flow also comprises one or more of the following identifying characteristics:
   source Internet Protocol (IP);
   destination IP;
   source port;
   destination port; and
   IP protocol.

15. The network device of claim 11, wherein the two or more sub-time windows are equal in length, and are each ten minutes or less.

16. The network device of claim 15, wherein the length of the two or more sub-time windows is determined using a sub-time window length determining machine learning algorithm.

17. The network device of claim 16, wherein the length of the two or more sub-time windows maximizes the number of sampled traffic flows which are classified as outliers per sub-time window.

18. The network device of claim 16, wherein the outlier classification machine learning algorithm is an unsupervised machine learning algorithm.

19. A non-transitory computer-readable storage medium including instructions that, when executed by at least one processor of a computing system, cause the computing system to perform a method comprising:
   obtaining a sample of traffic flow data during a defined time window, wherein:
      the sample of traffic flow data comprises information associated with a sampled subset of all traffic flows transferred by a network device in the defined time window, and
      each sampled traffic flow has one or more behavioral characteristics;
   partitioning the defined time window into two or more sub-time windows;
   in each sub-time window, using an outlier classification machine learning algorithm to assign an outlier-related classification to one or more sampled traffic flows based on relative behavioral characteristics of the sampled traffic flows;
   aggregating the outlier-related classifications for each sampled traffic flow during the defined time window;

processing traffic flows based on the aggregated outlier-related classifications for one or more sampled traffic flows.

20. The non-transitory computer-readable storage medium of claim 19, wherein the lengths of the two or more sub-time windows are determined using a sub-time window length determining machine learning algorithm.

* * * * *